US010174144B2

(12) United States Patent
Kraus et al.

(10) Patent No.: US 10,174,144 B2
(45) Date of Patent: Jan. 8, 2019

(54) CATIONIC COPOLYMERS

(71) Applicant: Construction Research & Technology, GmbH, Trostberg (DE)

(72) Inventors: Alexander Kraus, Pittenhart (DE); Tatiana Mitkina, Traunstein (DE); Frank Dierschke, Oppenheim (DE); Maxim Pulkin, Rosenheim (DE); Luc Nicoleau, Ludwigshafen am Rhein (DE)

(73) Assignee: Construction Research & Technology, GmbH, Trostberg (DE)

( * ) Notice: Subject to any disclaimer, the term of this patent is extended or adjusted under 35 U.S.C. 154(b) by 114 days.

(21) Appl. No.: 15/022,291

(22) PCT Filed: Aug. 5, 2014

(86) PCT No.: PCT/EP2014/066772
§ 371 (c)(1),
(2) Date: Mar. 16, 2016

(87) PCT Pub. No.: WO2015/043805
PCT Pub. Date: Apr. 2, 2015

(65) Prior Publication Data
US 2016/0369024 A1 Dec. 22, 2016

(30) Foreign Application Priority Data
Sep. 27, 2013 (EP) ..................... 13186438

(51) Int. Cl.
*C08F 220/28* (2006.01)
*C04B 24/26* (2006.01)
*C08F 220/34* (2006.01)
*C08F 220/36* (2006.01)
*C04B 28/00* (2006.01)
*C04B 28/02* (2006.01)

(52) U.S. Cl.
CPC ........ *C08F 220/36* (2013.01); *C04B 24/2647* (2013.01); *C04B 24/2652* (2013.01); *C04B 24/2658* (2013.01); *C04B 28/006* (2013.01); *C04B 28/02* (2013.01); *C08F 220/28* (2013.01); *C08F 220/34* (2013.01); *Y02P 40/165* (2015.11); *Y02W 30/92* (2015.05); *Y02W 30/94* (2015.05)

(58) Field of Classification Search
CPC .... C08F 220/36; C08F 220/28; C08F 220/34; C08B 24/2647; C08B 24/2658; C08B 28/006; C08B 28/02
USPC .......................................... 524/5
See application file for complete search history.

(56) References Cited

U.S. PATENT DOCUMENTS

| 4,349,386 A | 9/1982 | Davidovits |
| 4,472,199 A | 9/1984 | Davidovits |
| 4,509,985 A | 4/1985 | Davidovits et al. |
| 4,725,665 A | 2/1988 | Pieh et al. |
| 5,071,934 A | 12/1991 | Peiffer |
| 5,292,793 A | 3/1994 | Ramesh et al. |
| 5,601,725 A | 2/1997 | Chung et al. |
| 5,707,445 A | 1/1998 | Yamato et al. |
| 6,187,841 B1 | 2/2001 | Tanaka et al. |
| 6,187,887 B1 | 2/2001 | Albrecht et al. |
| 6,297,335 B1 | 10/2001 | Funk et al. |
| 6,376,581 B1 | 4/2002 | Tanaka et al. |
| 6,462,110 B2 | 10/2002 | Satoh et al. |
| 7,238,760 B2 | 7/2007 | Schinabeck et al. |
| 7,390,774 B2 | 6/2008 | Ghosh et al. |
| 7,605,196 B2 | 10/2009 | Schinabeck et al. |
| 7,772,300 B2 | 8/2010 | Schinabeck et al. |
| 8,202,362 B2 | 6/2012 | Davidovits et al. |
| 8,343,473 B2 | 1/2013 | Youngblood et al. |
| 8,349,960 B2 | 1/2013 | Gaeberlein et al. |
| 8,906,986 B2 | 12/2014 | Schinabeck et al. |
| 2001/0012864 A1 | 8/2001 | Satoh et al. |
| 2002/0151637 A1 | 10/2002 | Pretorious et al. |
| 2004/0209780 A1 | 10/2004 | Harris et al. |
| 2005/0032998 A1* | 2/2005 | Morschhaeuser .... A61K 8/8158 526/287 |
| 2005/0113280 A1* | 5/2005 | Reddy .................. C11D 3/0036 510/475 |
| 2007/0129516 A1* | 6/2007 | Detering ............... C08F 220/26 526/260 |
| 2009/0244693 A1* | 10/2009 | Nishio ...................... G02F 1/19 359/321 |
| 2009/0253879 A1* | 10/2009 | Nishio .................. C08F 220/36 526/258 |
| 2009/0311302 A1* | 12/2009 | Youngblood ........... C12C 21/18 424/423 |
| 2010/0010139 A1 | 1/2010 | Davidovits et al. |
| 2010/0087569 A1 | 4/2010 | Friedrich et al. |
| 2012/0126163 A1* | 5/2012 | Ghosh .................... D06M 11/83 252/8.63 |
| 2013/0079481 A1 | 3/2013 | Youngblood et al. |
| 2013/0136783 A1 | 5/2013 | Youngblood et al. |
| 2014/0066547 A1 | 3/2014 | Schinabeck et al. |
| 2014/0080977 A1 | 3/2014 | Youngblood et al. |

FOREIGN PATENT DOCUMENTS

| CN | 1679400 A | 10/2005 |
| CN | 102535175 A | 7/2012 |

(Continued)

OTHER PUBLICATIONS

Zhang et al. ("A new comb-like copolymer and its blend with poly(ethylene oxide) for solid electrolytes and application in dye-sensitized solar cells". Solar Energy (2012), 86(9), (pp. 2346-2353).*

*Primary Examiner* — Kelechi C Egwim
(74) *Attorney, Agent, or Firm* — Curatolo Sidoti Co., LPA; Joseph G. Curatolo; Salvatore A. Sidoti

(57) ABSTRACT

The present invention relates to cationic copolymers, a process for the production of these cationic copolymers and the use of these cationic copolymers as dispersants for geopolymer binder systems. These cationic copolymers where the cationic charge is due to the presence of certain cyclic and/or polycationic groups are stable towards Hoffmann elimination that would otherwise occur at very high pH values. Moreover, the dispersing effect of cationic polymers can be further enhanced through the addition of polyvalent anions.

9 Claims, No Drawings

(56) References Cited

FOREIGN PATENT DOCUMENTS

| | | |
|---|---|---|
| DE | 1 671 017 A1 | 9/1971 |
| EP | 0 214 412 A1 | 7/1986 |
| EP | 1 110 981 A2 | 6/2001 |
| EP | 1 142 847 A2 | 10/2001 |
| EP | 2 458 083 A2 | 5/2012 |
| EP | 2 463 317 A1 | 6/2012 |
| FR | 2 777 011 A1 | 10/1999 |
| GB | 5022 | 12/1824 |
| GB | 1169582 | 11/1969 |
| WO | WO 85/03699 A1 | 8/1985 |
| WO | WO 2008/012438 A2 | 1/2008 |
| WO | WO 2012/076365 A1 | 6/2012 |
| WO | WO 2012/143205 A1 | 10/2012 |

\* cited by examiner

CATIONIC COPOLYMERS

CROSS REFERENCE TO RELATED APPLICATIONS

This application is a national stage application of International Application No. PCT/EP2014/066772, filed 5 Aug. 2014, which claims priority from European Patent Application No. 13186438.1, filed 27 Sep. 2013, which applications are incorporated herein by reference.

The present invention relates to cationic copolymers, a process for the production of these cationic copolymers and the use of these cationic copolymers as dispersants for geopolymer binder systems.

Similar dispersants are described in WO 2012/076365 A1, claiming a copolymer consisting of 16 to 95 mol-% of a cationic structural unit (A), 5 to 55 mol % of a macromonomeric structural unit (B), up to 80 mol % of a structural unit (C), and up to 80 mol % of a structural unit (D) other than the structural unit (C), wherein the structural unit (A) includes at least one unit of the following general formulae (I) and/or (II):

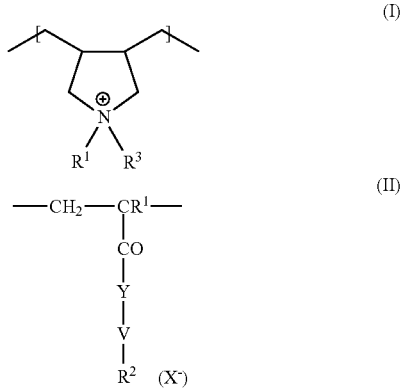

where
$R^1$ in each occurrence is the same or different and represents hydrogen and/or methyl,

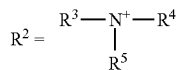

$R^3$, $R^4$ and $R^5$ in each occurrence are the same or different and each independently represent hydrogen, an aliphatic hydrocarbonaceous moiety having 1 to 20 carbon atoms, a cycloaliphatic hydrocarbonaceous moiety having 5 to 8 carbon atoms and/or aryl having 6 to 14 carbon atoms or polyethylene glycol (PEG),
Y in each occurrence is the same or different and represents oxygen, —NH and/or —$NR^3$,
V in each occurrence is the same or different and represents

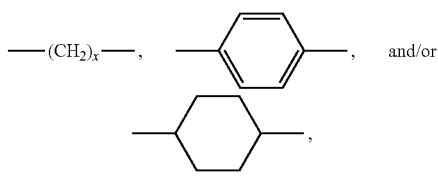

where
x in each occurrence is the same or different and represents an integer from 1 to 6, and
X in each occurrence is the same or different and represents a halogen atom, a $C_{1-4}$-alkyl sulfate and/or a $C_{1-4}$-alkyl sulfonate; as well as
the use of these copolymers as additives for aqueous building material systems containing inorganic binders, in particular calcium sulfate based binders.

Portland cement was first referred to in British Patent BP 5022, since which time it has undergone continual further development. It is nowadays considered one of the most widespread inorganic binders. Portland cement hardens hydraulically by virtue of its high CaO content.

Certain slags from metallurgical processes can be used in the form of latent hydraulic binders as admixtures to Portland cement. Also possible is activation with strong alkalis, such as alkali metal hydroxides or waterglasses, for example.

Inorganic binder systems based on reactive, water-insoluble compounds on the basis of $SiO_2$ in conjunction with $Al_2O_3$, which cure in an aqueous-alkali medium, are likewise common knowledge. Cured binder systems of this kind are also called "geopolymers" and are described for example in U.S. Pat. No. 4,349,386, WO 85/03699 and U.S. Pat. No. 4,472,199.

Reactive oxide mixtures employed in this context include metakaolin, microsilica, slags, fly ashes, activated clay, pozzolans or mixtures thereof. The alkali medium for activating the binders consists typically of aqueous solutions of alkali metal carbonates, alkali metal fluorides, alkali metal hydroxides, alkali metal aluminates and/or alkali metal silicates, such as soluble waterglass. In comparison to Portland cement, geopolymers may be more cost-effective and more stable, and may have a more favourable $CO_2$ emissions balance.

Aqueous cement suspensions are often mixed with additives in the form of dispersants in order to improve their processing properties, such as kneadability, fluidity, sprayability, spreadability or pumpability. These admixtures are capable of disrupting agglomerates, by adsorption on the surface of the particles, and of dispersing the particles formed. Especially in the case of highly concentrated dispersions, this results in a marked improvement in processing properties.

In the production of cementitious construction material mixtures such as concrete, this effect can be utilized to particularly advantageous effect, since otherwise, in order to achieve a readily processible consistency, substantially more water would be needed than would be necessary for the subsequent hydration process. As a result of this excess water, which gradually evaporates after hardening has taken place, cavities remain which significantly impair the mechanical strength and robustness of the constructions. The said plasticizers or dispersants are used in order to reduce the water fraction which is excessive in the sense of hydration, and/or to optimize the processing properties for a given water/cement ratio.

Examples of the cement dispersants or plasticizers used primarily to date are salts of naphthalenesulphonic acid/formaldehyde condensates (cf. EP 214412 A1; identified hereinafter as naphthalenesulphonates), salts of melaminesulphonic acid/formaldehyde condensates (cf. DE 1671017 A; identified below as melaminesulphonates), and also salts of polycarboxylic acids (cf. U.S. Pat. No. 5,707,445 B1, EP 1110981 A2, EP 1142847 A2; identified below as polycarboxylates). Such polycarboxylates are prepared mostly by radical copolymerization of ethylenically unsaturated carboxylic acids (such as acrylic acid, methacrylic acid or maleic acid and/or salts thereof) and poly(alkylene oxides) having a polymerizable end group (such as methacrylates, allyl ethers or vinyl ethers). This mode of preparation leads to polymers having a comb-like structure.

The activity of the molecules used derives from two different effects. Firstly, the negatively charged acid groups of the plasticizers adsorb on the cement grain surface, which is positively charged through calcium ions. The electrostatic double layer formed in this way results in electrostatic repulsion between the particles, which is relatively weak, however. In the case of the abovementioned comb polymers, this electrostatic repulsion is reinforced additionally by the steric bulk of the non-adsorbing poly(alkylene oxide) chains. This steric repulsion is much stronger than the electrostatic repulsion, and so it is easy to explain why the plasticizing effect of the polycarboxylates is much greater than that of the naphthalene- or melaminesulphonates; in other words, in order to obtain comparable plasticization, the polycarboxylate can be added at a significantly lower rate.

The aforementioned geopolymers exhibit distinct differences relative to the cementitious systems, these differences making it more difficult or impossible to use the stated plasticizers. In order to obtain acceptable hardening times, the reactive oxide components require strong alkaline activation. This higher level of alkalinity imposes particular requirements on the dispersants. These requirements, in the case of many commercial concrete plasticizers, not being sufficiently ensured. Furthermore, these low-calcium systems generally do not have any positively charged grain surfaces. Instead, the surfaces are silicate or $SiO_2$ surfaces, which at the pH values involved are often negatively charged. Moreover, the high level of alkalinity that is required for activation also constitutes a high salt load, which may annul a dispersion effect that is possible at lower pH levels.

The initially mentioned WO 2012/076365 discloses cationic copolymers which are quite promising for dispersing geopolymer binder systems exhibiting negatively charged grain surfaces. However, these copolymers show a decay in positive charge over time when subjected to the highly alkaline environments that are present in geopolymer systems. This is due to the so-called Hoffmann elimination as shown in the following reaction scheme:

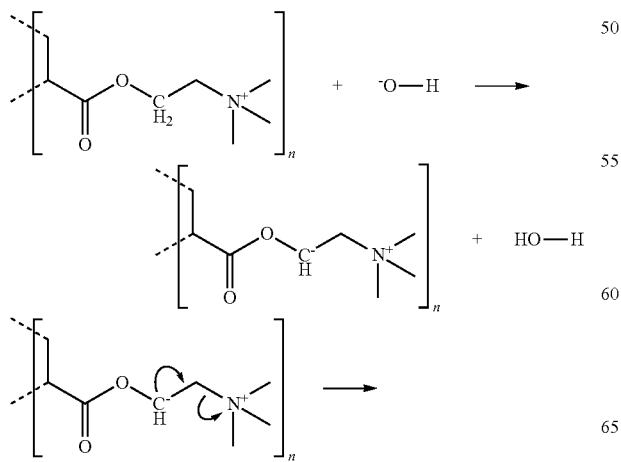

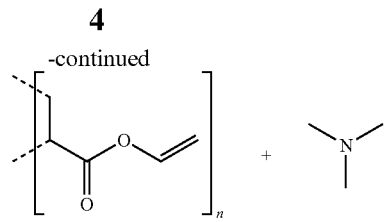

As a matter of consequence, cationic copolymers that are stable towards Hoffmann elimination would be highly desirable.

An alternative solution to this problem was found in our not yet published PCT/EP2013/056761 with priority date of Apr. 11, 2012, disclosing a polycondensation product comprising as monomer components:

A) at least one aryl polyoxyalkylene ether of the formula (i)

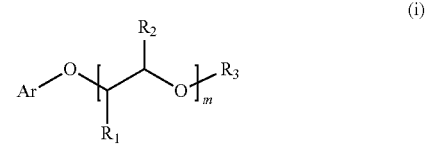

where
Ar is an aryl group,
$R_1$ and $R_2$ each independently of one another are selected from H, methyl and ethyl, with preferably at least one of the groups $R_1$ and $R_2$ being H,
m is an integer from 1 to 300 and
$R_3$ is selected from the group consisting of H, alkyl, aryl, aralkyl, alkaryl, phosphate, and also mixtures thereof;

B) at least one aromatic compound of the formula (ii),

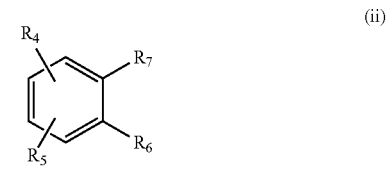

where $R_4$ and $R_5$ each independently of one another are selected from H, $R_8$, OH, $OR_8$, $C(O)R_8$, COOH, $COOR_8$, $SO_3H$, $SO_3R_8$ and $NO_2$ and also alkali metal salts, alkaline earth metal salts and ammonium salts thereof, or together are a further fused-on ring, where $R_8$ each independently is selected from the group consisting of alkyl, aryl, aralkyl, alkaryl, and $R_6$ and $R_7$ each independently of one another are selected from OH, ORS, $C(O)R_9$, COOH and $COOR_9$ and also alkali metal salts and alkaline earth metal salts and ammonium salts thereof, where $R_9$ each independently is selected from the group consisting of alkyl, aryl, aralkyl, alkaryl;

C) at least one aldehyde; and also optionally

D) at least one further aromatic compound, selected from the group consisting of phenol, 2-phenoxyethanol, 2-phenoxyethyl phosphate and phosphonate, 2-phenoxyacetic acid, 2-(2-phenoxyethoxy)ethanol, 2-(2-phenoxyethoxy)ethyl phosphate and phosphonate, 2-[4-(2-hydroxyethoxy)phenoxy]ethyl phosphate and phosphonate, 2-[4-(2-phosphonatooxyethoxy)phenoxy]ethyl phosphate and phosphonate, methoxyphenol, phenolsulphonic acid, furfuryl alcohol, and also mixtures thereof; as well as
the use of this polycondensation product as a dispersant for aqueous suspensions of inorganic binders selected from the group encompassing hydraulic binders, latent hydraulic binders, pozzolanic binders and/or alkali-activated aluminosilicate binders, and also mixtures thereof.

This polycondensation product, however, having a high affinity to silicate or $SiO_2$ surfaces due to component B), does not work well with aqueous waterglass since the alkaline activator of the geopolymer system, waterglass, binds the majority of the polycondensation product. Thus, a different approach was desirable.

The problem addressed by the inventors was that of substantially avoiding at least some of the disadvantages of the prior art discussed above. The intention more particularly was to find dispersants which are capable of adsorbing to low-calcium binders at relatively high pH levels and hence also of dispersing geopolymer systems. These dispersants ought to exhibit high affinity to negatively charged surfaces, preferably at very high pH levels. They should ideally also be suitable for the dispersion of mixed systems comprising not only geopolymer raw materials, such as microsilica, metakaolin, slags, fly ashes, clays, pozzolans or mixtures thereof (also known as "supplemental cementitious materials" or "SCM") but also systems containing a minor amount of Portland cement.

The problems identified above are solved with the features of the independent claims. The dependent claims relate to preferred embodiments.

It was surprisingly found that the cationic copolymers of the present invention where the cationic charge is due to the presence of certain cyclic and/or polycationic groups are stable towards Hoffmann elimination.

The present invention thus firstly provides a cationic copolymer, comprising
a) 3 to 97 mol-% of a cationic structural unit of formula (III)

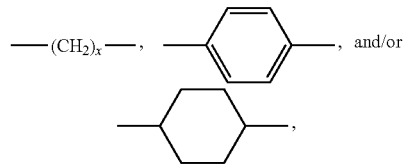

wherein
$R^1$ in each occurrence is the same or different and represents hydrogen and/or methyl,
$R^2$ in each occurrence is the same or different and is selected from the group consisting of:

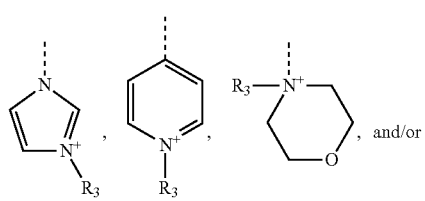

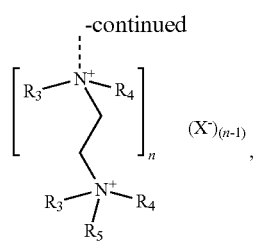

wherein
$R^3$, $R^4$ and $R^5$ in each occurrence are the same or different and each independently represent hydrogen, an aliphatic hydrocarbon moiety having 1 to 20 carbon atoms, a cycloaliphatic hydrocarbon moiety having 5 to 8 carbon atoms, aryl having 6 to 14 carbon atoms and/or a polyethylene glycol (PEG) moiety,
l in each occurrence is the same or different and represents an integer from 0 to 2,
m in each occurrence is the same or different and represents 0 or 1,
n in each occurrence is the same or different and represents an integer from 1 to 10,
Y in each occurrence is the same or different and represents an absent group, oxygen, NH and/or $NR^3$,
V in each occurrence is the same or different and represents

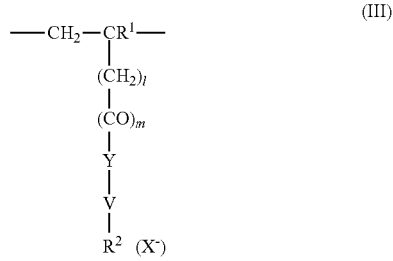

wherein
x in each occurrence is the same or different and represents an integer from 0 to 6, and
X in each occurrence is the same or different and represents a halogen atom, a $C_{1-4}$-alkyl sulfate, a $C_{1-4}$-alkyl sulfonate, a $C_{6-14}$-(alk)aryl sulfonate and/or a monovalent equivalent of a polyvalent anion, which is selected from a sulfate, a disulfate, a phosphate, a diphosphate, a triphosphate and/or a polyphosphate;
b) 97 to 3 mol-% of a macromonomeric structural unit of formula (IV)

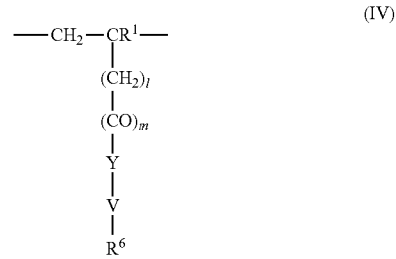

wherein
$R^6$ in each occurrence is the same or different and represents a polyoxyalkylene group of the following formula (V)

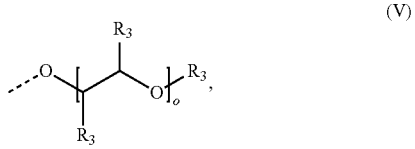

wherein
o in each occurrence is the same or different and represents an integer from 1 to 300, and
$R^1$, $R^3$, l, m, Y, V, and x have the meanings given above, provided that, in both structural units (III) and (IV), Y represents an absent group when x is =0.

For the purpose of the present invention, a "cationic copolymer" is a copolymer having cationic groups (as side chains) attached to a polymeric "backbone" or main chain. In order to exhibit a sufficient electrostatic repulsion, the cationic copolymers of the invention must also possess non-adsorbing polyoxyalkylene side chains, i.e. the polyoxyalkylene groups of formula (V). Thus, the cationic copolymers of the present invention, like the polycarboxylate ether copolymers known in the art, form comb structures and may thus be referred to as comb polymers. Obviously, the structural units (III) and (IV) may be arranged randomly, alternatingly, graduatedly and/or blockwise within the polymeric main chain.

Without wishing to be bound by theory, it is believed that in the case of cyclic cationic groups falling under the definition of $R^2$ it is the stability of the ring system which is responsible for the cationic copolymer's stability towards Hoffmann elimination. In the case of polycationic groups it is believed that the relative stability is due to a statistic effect, i.e. that statistically only parts of these groups may eliminate while other parts of these groups will still remain bound to the polymeric main chain.

In the cationic copolymer of the invention the monomer components corresponding to the structural units (III) and (IV) are preferably selected from vinyl ethers, vinyloxy $C_{1-6}$-alkyl ethers, in particular vinyloxy butyl ethers, allyl ethers, methallyl ethers, 3-butenyl ethers, isoprenyl ethers, acrylic esters, methacrylic esters, acrylamides, methacrylamides, and mixtures thereof. In other words, preferred monomers corresponding to the structural units (III) and (IV) include, but are not limited to, the following partial structures:

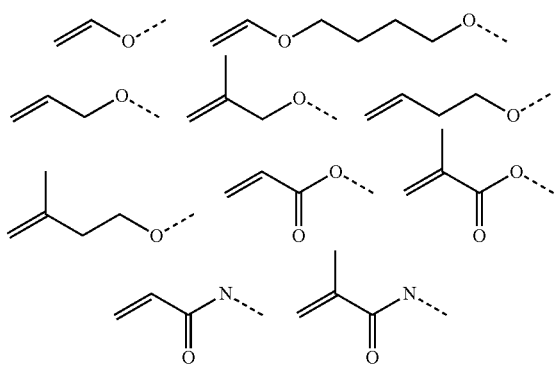

Acrylic esters, methacrylic esters, acrylamides, methacrylamides, and the like may be partially substituted by the corresponding unsaturated dicarboxylic acid derivatives such as maleic acid derivatives, provided that these do not possess free acid functionalities, and vinyl ethers and the like may be partially substituted by the corresponding diene derivatives, as long as these derivatives are radicalically co-polymerizable.

In the cationic copolymer of the invention, "o" is preferably from 5 to 300, more preferably 10 to 200, and in particular 20 to 100.

In the cationic copolymer of the invention the oxyalkylene units of the polyoxyalkylene group of formula (V) are preferably selected from ethylene oxide groups and/or propylene oxide groups, which may be arranged randomly, alternatingly, graduatedly and/or blockwise within the polyoxyalkylene group. Moreover, the polyoxyalkylene group of formula (V) is preferably a mixture with different values for "o" within the specified definition.

The cationic copolymer of the invention preferably comprises 10 to 90 mol-% of the cationic structural unit and 90 to 10 mol-% of the macromonomeric structural unit, more preferably 25 to 75 mol-% of the cationic structural unit and 75 to 25 mol-% of the macromonomeric structural unit and in particular 40 to 60 mol-% of the cationic structural unit and 60 to 40 mol-% of the macromonomeric structural unit.

That copolymer has preferably a molecular weight in the range of from 1000 to 500000, more preferably 2000 to 150000 and particularly 4000 to 100000 g/mol.

Secondly, the present invention provides a process for the production of the cationic copolymer of the invention, which is characterized in that 3 to 97 mol-% of a cationic monomer (A)

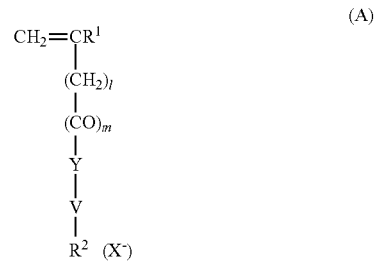

and 97 to 3 mol-% of a macromonomer (B)

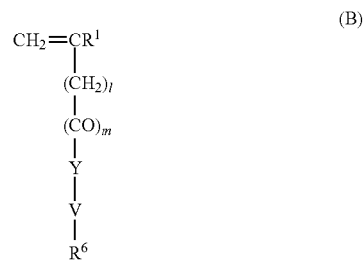

are radically copolymerized,
wherein $R^1$ to $R^6$, l, m, n, o, Y, V, x and X have the meanings given above.

In this process the cationic monomer (A) is preferably selected from quaternized N-vinylimidazole, quaternized N-allylimidazole, quaternized 4-vinylpyridine, quaternized 1-[2-(acryloyloxy)ethyl]-1H-imidazole, 1-[2-(methacryloyloxy)ethyl]-1H-imidazole, and mixtures thereof. A graphical representation of these preferred cationic monomers (in non-quaternized form) is given hereinbelow:

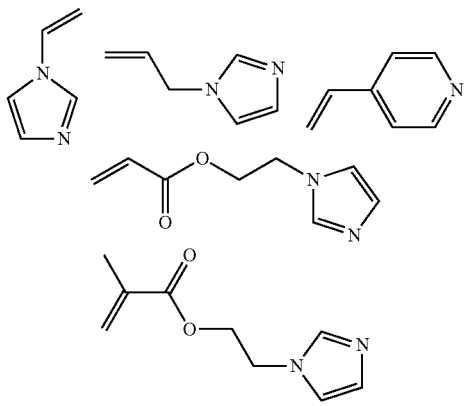

Thirdly, the present invention provides the use of the cationic copolymer of the invention as a dispersant for geopolymer binder systems. In other words, the present invention provides the use of the cationic copolymer of the invention for dispersing aqueous suspensions of geopolymer binders selected from the group comprising hydraulic binders, latent hydraulic binders, pozzolanic binders and/or alkali-activated aluminosilicate binders, and also mixtures thereof.

In this context, the said binders are advantageously selected from the following groups: the hydraulic binders from cements, more particularly from Portland cement and aluminate cement, and also mixtures thereof, the latent hydraulic binders from industrial and/or synthetic slags, more particularly from blast furnace slag, slag sand, ground slag sand, electrothermic phosphorus slag, steel slag, and also mixtures thereof, and the pozzolanic binders from amorphous silica, preferably precipitated silica, pyrogenic silica and microsilica, finely ground glass, fly ash, preferably brown-coal fly ash and mineral coal fly ash, metakaolin, natural pozzolanas such as tuff, trass and volcanic ash, natural and synthetic zeolites, and also mixtures thereof.

Portland cement contains about 70% by weight CaO+MgO, about 20% by weight $SiO_2$ and about 10% by weight $Al_2O_3+Fe_2O_3$. Aluminate cement ("high-alumina cement") contains about 20% to 40% by weight CaO, up to about 5% by weight $SiO_2$, about 40% to 80% by weight $Al_2O_3$ and up to about 20% by weight $Fe_2O_3$. These cements are well known in the art.

The slags may be both industrial slags, i.e. waste products from industrial processes, and synthetically reproduced slags. The latter is advantageous, since industrial slags are not always available in consistent quantity and quality.

For the purposes of the present invention, a latent hydraulic binder is preferably a binder in which the molar ratio of (CaO+MgO):$SiO_2$ is between 0.8 and 2.5 and more preferably between 1.0 and 2.0.

Blast furnace slag, a typical latent hydraulic binder, generally contains 30% to 45% by weight CaO, about 4% to 17% by weight MgO, about 30% to 45% by weight $SiO_2$ and about 5% to 15% by weight $Al_2O_3$, typically about 40% by weight CaO, about 10% by weight MgO, about 35% by weight $SiO_2$ and about 12% by weight $Al_2O_3$. The cured products generally have the properties of hydraulically cured systems.

"Blast furnace slag" is a waste product of the blast furnace process. "Slag sand" is granulated blast furnace slag, and "ground granulated blast furnace slag" is finely pulverized slag sand. The ground slag sand varies, according to origin and processing form, in its particle size and grain-size distribution, with the particle size affecting the reactivity. As a characteristic variable for the particle size, the figure known as the Blaine value is employed, which is typically in the order of magnitude of 200 to 1000, preferably between 300 and 500 $m^2$ $kg^{-1}$. The finer the grind, the higher the reactivity.

Electrothermic phosphorus slag is a waste product from the production of phosphorus by electrothermic means. It is less reactive than blast furnace slag and contains about 45% to 50% by weight CaO, about 0.5% to 3% by weight MgO, about 38% to 43% by weight $SiO_2$, about 2% to 5% by weight $Al_2O_3$ and about 0.2% to 3% by weight $Fe_2O_3$, and also fluoride and phosphate. Steel slag is a waste product from various steel manufacturing processes, with a highly varying composition (see Caijun Shi, Pavel V. Krivenko, Della Roy, Alkali-Activated Cements and Concretes, Taylor & Francis, London & New York, 2006, pp. 42-51).

Amorphous silica is preferably an X-ray-amorphous silica, i.e. a silica which exhibits no crystallinity in a powder diffraction procedure. The amorphous silica of the invention advantageously has an $SiO_2$ content of at least 80% by weight, preferably at least 90% by weight. Precipitated silica is obtained industrially via precipitation processes starting from waterglass. Depending on the manufacturing method, precipitated silica is also called silica gel. Pyrogenic silica is generated by reacting chlorosilanes, such as silicon tetrachloride, in an oxyhydrogen flame. Pyrogenic silica is an amorphous $SiO_2$ powder with a particle diameter of 5 to 50 nm and a specific surface area of 50 to 600 $m^2$ $g^{-1}$.

Microsilica is a by-product of silicon or ferrosilicon manufacture and likewise consists very largely of amorphous $SiO_2$ powder. The particles have diameters in the order of magnitude of 0.1 µm. The specific surface area is in the order of magnitude of 15 to 30 $m^2$ $g^{-1}$. In contrast, commercial silica sand is crystalline and has comparatively large particles and a comparatively low specific surface area. In accordance with the invention it serves as an inert aggregate.

Fly ashes are formed in operations including the combustion of coal in power stations. Class C fly ash (brown coal fly ash) contains, according to WO 08/012438 about 10% by weight CaO, whereas class F fly ash (mineral coal fly ash) contains less than 8% by weight, preferably less than 4% by weight and typically about 2% by weight CaO.

Metakaolin is formed in the dehydrogenation of kaolin. Whereas kaolin gives off physically bound water at 100 to 200° C., dehydroxylation occurs at 500 to 800° C., with collapse of the lattice structure and formation of metakaolin ($Al_2Si_2O_7$). Pure metakaolin, accordingly, contains about 54% by weight $SiO_2$ and about 46% by weight $Al_2O_3$.

An overview of further pozzolanic binders suitable in accordance with the invention is found for example in Caijun Shi, Pavel V. Krivenko, Della Roy, Alkali-Activated Cements and Concretes, Taylor & Francis, London & New York, 2006, pp. 51-63. Testing for pozzolan activity can take place in accordance with DIN EN 196 Part 5.

Moreover, the above-mentioned alkali-activated aluminosilicate binders preferably comprise latent hydraulic and/or pozzolanic binders as defined above and also alkaline activators, such as aqueous solutions of alkali metal carbonates, alkali metal fluorides, alkali metal hydroxides, alkali metal aluminates and/or alkali metal silicates, such as soluble waterglass.

For the purposes of the present invention, "alkali-activated alumosilicate binders" are binder systems which comprise latent hydraulic and/or pozzolanic binders as defined above and also alkaline activators as defined above. Conversely, "alkali-activatable alumosilicate binders" mean binder systems of the same kind which comprise the alkaline activators in a dry form. In both cases, the amount of Portland cement and/or aluminate cement in total ought to be kept below 20% by weight, preferably below 10% by weight, in order to rule out hydraulic curing of the cement component.

The alkaline silicate is advantageously selected from compounds having the empirical formula m $SiO_2 \cdot nM_2O$, where M stands for Li, Na, K and $NH_4$, and also mixtures thereof, preferably for Na and K. The molar ratio m:n is advantageously 0.5 to 4.0, preferably 0.6 to 3.0 and more particularly 0.7 to 2.5. The alkali metal silicate is preferably waterglass, more preferably a liquid waterglass, and more particularly a sodium or potassium waterglass. Use may also be made, however, of lithium or ammonium waterglasses, and also of mixtures of the stated waterglasses.

The above-specified ratio m:n (also called "modulus") ought preferably not to be exceeded, since otherwise it is no longer likely that there will be any complete reaction of the components. It is also possible to employ lower moduli, such as around 0.2. Waterglasses having higher moduli ought before use to be adjusted to moduli in the range according to the invention, using a suitable aqueous alkali metal hydroxide.

Potassium waterglasses in the advantageous modulus range are commercialized primarily as aqueous solutions, being highly hygroscopic; sodium waterglasses in the advantageous modulus range are also available commercially as solids. The solids contents of the aqueous waterglass solutions are generally 20% by weight to 60% by weight, preferably 30% to 50% by weight.

Waterglasses can be prepared industrially by melting silica sand with the corresponding alkali metal carbonates. Alternatively they may also be obtained without difficulty from mixtures of reactive silicas with the corresponding aqueous alkali metal hydroxides. In accordance with the invention, therefore, it is possible to replace at least part of the alkali metal silicate by a mixture of a reactive silica and the corresponding alkali metal hydroxide.

The cationic copolymer of the invention can be used as a dispersant for construction material formulations and/or in construction material products such as on-site concrete, pre-cast concrete parts, concrete ware, cast concrete stones and also in-situ concrete, air-placed concrete, ready-mixed concrete, construction adhesives and adhesives for thermal insulation composite systems, concrete repair systems, one-component and two-component sealing slurries, screeds, filling and levelling compounds, tile adhesives, renders, adhesives and sealants, coating systems, more particularly for tunnels, wastewater channels, splash protection and condensate lines, dry mortars, joint grouts, drainage mortars and/or repair mortars.

Moreover, the cationic copolymer of the invention ought advantageously to be added in the range from 0.01% to 10.0%, preferably from 0.1% to 5.0% and in particular from 0.5 to 2%, by weight, based on the sum of the inorganic binders. (Not included in this reckoning are, for example, fillers and aggregates, such as sands and gravels, and also water and other possible additions).

Finally, the cationic copolymer of the invention may be used together with further auxiliaries that are known per se in the art, selected from the group, comprising glycols, polyalcohols, amine alcohols, organic acids, amino acids, sugars, molasses, organic and inorganic salts, polycarboxylate ethers, naphthalenesulphonate, melamine/formaldehyde polycondensation products, lignosulphonate, and also mixtures thereof.

A particularly preferred embodiment of this invention is the use of the cationic copolymer of the invention together with a polyvalent anion. It was surprisingly found that the addition of a polyvalent anion not only enhances the effect of the cationic copolymer of the invention in dispersing geopolymer binder systems, but it also enhances the effect of cationic polymers of different types, including e.g. homopolymers without the macromonomeric structural unit of formula (IV) (i.e. 0 mol-%). This finding not only pertains to the selection of the anion X as defined hereinabove, but it also pertains to the fact that an additional source of a polyvalent anion may be added. This source may be the salt of the polyvalent anion with a monovalent, divalent and/or trivalent cation. This cation can be selected from alkali metals such as lithium, sodium and potassium, alkaline earth metals such as magnesium and calcium, earth metals such as aluminum, and/or transition metals such as zinc, iron, molybdenum and tungsten. Also organic cations are suitable.

The polyvalent anion may also be added in the form of an acid, such as phosphoric acid, or in the form of an (acidic) salt, such as a hydrogen or dihydrogen phosphate or hydrogen sulfate. The salt should be water soluble. It has been found that an addition of 50 to 200 mM of phosphate is very effective in this respect. Such addition is very effective in the pH range of 11 to 14, and works well in systems where the activator is alkali waterglass, alkali carbonate and/or alkali hydroxide.

The polyvalent anion is preferably selected from a sulfate, a disulfate, a phosphate, a diphosphate, a triphosphate, a polyphosphate and/or a phosphonate.

The polyvalent anion may however be also selected from complex anions such as $[M(CN)_x]^{n-}$, $[M(SCN)_x]^{n-}$ and/or $[MF_x]^{n-}$, wherein M is Fe, W, and/or Mo, and $[Mo_2(Cl)_8]^{n-}$, as well as from homo- and heteropolyoxometalates (for example Keggin-$[XM_{12}O_{40}]^{n-}$ or Dawson-anions $[X_2M_{18}O_{62}]^{n-}$, wherein M is Mo and/or W, and X is S, P, Si, etc.). Moreover, the polyvalent anion may also be selected from multiply charged phosphonates, such as 1-hydroxy-ethane-1,1-diphosphonate (HEDP), amino-tris(methylenephosphonate) (ATMP), ethylenediamine-tetra (methylenephosphonate) (EDTMP), diethylenetriamine-penta (methylenephosphonate) (DTPMP), hexamethylenediamine-tetra(methylenephosphonate) (HDTMP), hydroxyethyl-amino-di(methylenephosphonate) (HEMPA), and the like.

The present invention is now explained in more detail by means of the non-limiting examples hereinbelow.

EXAMPLES

Example 1

1-Allyl-3-methyl-imidazol-3-ium chloride (4.51 parts) was dissolved in water (5 parts) and nitrogen gas was bubbled through the resulting solution under stirring during 10 min. Then mercaptoethanol solution in water (0.99%, 3.03 parts) was added, and the obtained mixture was heated to 90° C. with reflux under continuous nitrogen flow. To this mixture an aqueous solution of polyethylene glycol methyl ether methacrylate (average molecular weight 950 g/mol, 57.43%, 23.49 parts) and an aqueous solution of the radical initiator WAKO V-50 (2,2'-azobis(2-methylpropionamidine) dihydrochloride, 1.19%, 10.12 parts) were added dropwise within 30 min simultaneously through two syringe pumps, followed by stirring of the reaction mixture at 90° C. during additional 3 hours. The resulting viscous colorless polymer solution was cooled to room temperature. The average molecular weight of the polymer (Mw) was 5.9 kDa and the polydispersity index (PDI) was 1.87 (cationic GPC, Column Shodex OHpak SB 804HQ and 802.5HQ, (PHM gel, 8×300 mm), eluent 0.05 M ammonium formate/methanol: 80/20 (vol.-%), pH~6.5, RI detection).

Example 2

2-[2-Dimethylaminoethyl(methyl)amino]ethyl 2-methylprop-2-enoate was doubly quaternized with methyl ester of p-toluenesulfonic acid in THF according to standard procedure. The obtained bis-p-toluenesulfonate (35.21 parts) was dissolved in water (40 parts), and molten polyethylene glycol methyl ether methacrylate (average molecular weight 950 g/mol, 19.00 parts) was added. Nitrogen was bubbled through the resulting solution under stirring during 10 min, then mercaptoethanol solution in water (4.76%, 1.05 parts) was added and the obtained mixture was heated to 90° C. with reflux under continuous nitrogen flow. An aqueous solution of the radical initiator WAKO V-50 (1.57%, 10.16 parts) was added dropwise through a syringe pump to the monomer mixture within 30 min, followed by stirring at 90° C. during additional 2 hours. The resulting viscous colorless polymer solution was cooled to room temperature. The average molecular weight of the polymer (Mw) was 159.1 kDa, PDI=2.26 (cationic GPC).

Example 3

Dimethyl-[2-(2-methylprop-2-enoyloxy)ethyl]-[2-(trimethylammonio)ethyl]ammonium bis-p-toluenesulfonate (42.25 parts) was dissolved in water (40 parts), and molten polyethylene glycol methyl ether methacrylate (average molecular weight 950 g/mol, 11.40 parts) was added. Nitrogen was bubbled through the resulting solution under stirring during 10 min, then mercaptoethanol solution in water (6.54%, 1.07 parts) was added and the obtained mixture was heated to 90° C. with reflux under continuous nitrogen flow. An aqueous solution of the radical initiator WAKO V-50 (2.25%, 10.23 parts) was added dropwise through a syringe pump to the monomer mixture within 30 min, followed by the addition of water (15 parts) and stirring at 90° C. during additional 2 hours. The resulting viscous colorless polymer solution was cooled to room temperature. The average molecular weight of the polymer (Mw) was 50.6 kDa, PDI=1.78 (cationic GPC).

Example 4

Polyethylene glycol methyl ether methacrylate (average molecular weight 950 g/mol, 19.00 parts) was dissolved in water (40 parts) and nitrogen gas was bubbled through the resulting solution under stirring during 10 min. Then mercaptoethanol solution in water (4.76%, 1.05 parts) was added and the obtained mixture was heated to 90° C. with reflux under continuous nitrogen flow. To this mixture an aqueous solution of dimethyl-[2-(2-methylprop-2-enoyloxy)ethyl]-[2-(trimethylammonio)ethyl]ammonium bis-p-toluenesulfonate (63.8%, 55.21 parts) and aqueous solution of the radical initiator WAKO V-50 (1.57%, 10.16 parts) were added dropwise within 30 min simultaneously through two syringe pumps, followed by stirring of reaction mixture at 90° C. during additional 1.5 hours. The resulting viscous colorless polymer solution was cooled to room temperature. The average molecular weight of the polymer (Mw) was 32.4 kDa, PDI=2.33 (cationic GPC).

Example 5 (Reference)

Dimethyl-[2-(2-methylprop-2-enoyloxy)ethyl]-[2-(trimethylammonio)ethyl]ammonium bis-p-toluenesulfonate (20.54 parts) was dissolved in water (40 parts) and nitrogen gas was bubbled through the resulting solution under stirring during 10 min. Then mercaptoethanol solution in water (4.76%, 1.05 parts) was added and the obtained mixture was heated to 90° C. with reflux condenser under continuous nitrogen flow. An aqueous solution of the radical initiator WAKO V-50 (1.86%, 10.19 parts) was added dropwise within 30 min through a syringe pump, followed by stirring of the reaction mixture at 90° C. during additional 2 hours. The resulting viscous colorless polymer solution was cooled to room temperature. The average molecular weight of the homopolymer (Mw) was 11.2 kDa, PDI=1.62 (cationic GPC).

Example 6 (Reference)

Dimethyl-[2-(2-methylprop-2-enoyloxy)ethyl]-[2-(trimethylammonio)ethyl]ammonium bis-methosulfate (80%, contained 85% bis-methosulfate and 15% of the analogous mono-methosulfate salt, 27.98 parts) was dissolved in water (27.98 parts) and nitrogen gas was bubbled through the resulting solution under stirring during 10 min. Then mercaptoethanol solution in water (10.71%, 1.12 parts) was added and the resulting mixture was heated to 90° C. with reflux under continuous nitrogen flow. An aqueous solution of the radical initiator WAKO V-50 (1.38%, 10.14 parts) was added dropwise within 30 min through a syringe pump, followed by stirring of reaction mixture at 90° C. during additional 2 hours. The resulting viscous colorless polymer solution was cooled to room temperature. The average molecular weight of the homopolymer (Mw) was 8.3 kDa, PDI=1.95 (cationic GPC).

Example 7

2-(2-Dimethylaminoethyloxy)ethyl 2-methylprop-2-enoate was quaternized with methyl ester of p-toluenesulfonic acid in THF according to standard procedure. The obtained p-toluenesulfonate (60.45 parts) was dissolved in water (50 parts), and molten polyethylene glycol methyl ether methacrylate (average molecular weight 950 g/mol, 24.70 parts) was added. Nitrogen was bubbled through the resulting solution under stirring during 10 min, then mercaptoethanol solution in water (10.71%, 1.12 parts) was added and the obtained mixture was heated to 90° C. with reflux under continuous nitrogen flow. An aqueous solution of the radical initiator WAKO V-50 (4.03%, 10.42 parts) was added dropwise through a syringe pump to the monomer mixture within 30 min, followed by stirring at 90° C. for one additional hour. The resulting viscous colorless polymer solution was cooled to room temperature. The average molecular weight of the polymer (Mw) was 203.0 kDa, PDI=2.37 (cationic GPC).

Example 8 (Reference)

Trimethyl-[2-[2-(2-methylprop-2-enoyloxy)ethoxy]ethyl]ammonium p-toluenesulfonate (39.91 parts) was dissolved in water (40 parts) and nitrogen gas was bubbled through the resulting solution under stirring during 10 min. Then mercaptoethanol solution in water (13.79%, 1.16 parts) was added and the resulting mixture was heated to 90° C. with reflux under continuous nitrogen flow. An aqueous solution of the radical initiator WAKO V-50 (5.30%, 10.56 parts) was added dropwise within 30 min through a syringe pump, followed by stirring of reaction mixture at 90° C. during additional 2 hours. The resulting viscous colorless polymer solution was cooled to room temperature. The average molecular weight of the homopolymer (Mw) was 32.7 kDa, PDI=2.03 (cationic GPC).

Example 9

Dimethyl-[2-(2-methylprop-2-enoyloxy)ethyl]-[2-(trimethylammonio)ethyl]ammonium bis-methosulfate (80%, contained 85% bis-methosulfate and 15% of the analogous mono-methosulfate salt, 91.77 parts), molten polyethylene glycol methyl ether methacrylate (average molecular weight 950 g/mol, 47.50 parts) and water (130 parts) were mixed, and nitrogen was bubbled through the resulting solution under stirring during 10 min. Then mercaptoethanol solution in water (18.70%, 1.23 parts) was added and the resulting mixture was heated to 90° C. with reflux under continuous nitrogen flow. An aqueous solution of the radical initiator WAKO V-50 (5.75%, 10.61 parts) was added dropwise through a syringe pump to the monomer mixture within 30 min, followed by stirring at 90° C. during additional 4 hours. The resulting viscous colorless polymer solution was cooled to room temperature. The average molecular weight of the polymer (Mw) was 42.9 kDa, PDI=2.30 (cationic GPC).

Example 10

Dimethyl-[2-(2-methylprop-2-enoyloxy)ethyl]-[2-(trimethylammonio)ethyl]ammonium bis-methosulfate (80%, contained 85% bis-methosulfate and 15% of the analogous mono-methosulfate salt, 87.85 parts), molten polyethylene glycol methyl ether methacrylate (average molecular weight 950 g/mol, 23.75 parts) and water (130 parts) were mixed, and nitrogen was bubbled through the resulting solution under stirring during 10 min. Then mercaptoethanol solution in water (10.71%, 1.12 parts) was added and the resulting mixture was heated to 90° C. with reflux under continuous nitrogen flow. An aqueous solution of the radical initiator WAKO V-50 (3.01%, 10.31 parts) was added dropwise through a syringe pump to the monomer mixture within 30 min, followed by stirring at 90° C. during additional 60 minutes. The resulting viscous colorless polymer solution was cooled to room temperature. The average molecular weight of the polymer (Mw) was 36.1 kDa, PDI=2.16 (cationic GPC).

Example 11

Dimethyl-[2-(2-methylprop-2-enoyloxy)ethyl]-[2-(trimethylammonio)ethyl]ammonium bis-p-toluenesulfonate (17.60 parts), molten polyethylene glycol methyl ether methacrylate (average molecular weight 950 g/mol, 28.50 parts), trimethyl-[2-(2-methylprop-2-enoyloxy)ethyl]ammonium chloride (8.31 parts) and water (45 parts) were mixed, and nitrogen was bubbled through the resulting solution under stirring during 10 min. Then mercaptoethanol solution in water (4.76%, 1.05 parts) was added and the resulting mixture was heated to 80° C. with reflux under continuous nitrogen flow. An aqueous solution of the radical initiator WAKO V-50 (1.57%, 10.16 parts) was added dropwise through a syringe pump to the monomer mixture within 30 min, followed by stirring at 80° C. during additional 3 hours. The resulting viscous colorless polymer solution was cooled to room temperature. The average molecular weight of the terpolymer (Mw) was 139.2 kDa, PDI=3.14 (cationic GPC).

Example 12

Dimethyl-[2-(2-methylprop-2-enoyloxy)ethyl]-[2-(trimethylammonio)ethyl]ammonium bis-p-toluenesulfonate (11.74 parts), molten polyethylene glycol methyl ether methacrylate (average molecular weight 950 g/mol, 19.00 parts), trimethyl-[2-(2-methylprop-2-enoyloxy)ethyl]ammonium chloride (16.62 parts) and water (45 parts) were mixed, and nitrogen was bubbled through the resulting solution under stirring during 10 min. Then mercaptoethanol solution in water (13.79%, 1.16 parts) was added and the obtained mixture was heated to 80° C. with reflux condenser under continuous nitrogen flow. An aqueous solution of the radical initiator WAKO V-50 (5.12%, 10.54 parts) was added dropwise through a syringe pump to the monomer mixture within 60 min, followed by stirring at 80° C. during additional 3 hours. The resulting viscous colorless polymer solution was cooled to room temperature. The average molecular weight of the terpolymer (Mw) was 87.9 kDa, PDI=2.89 (cationic GPC).

Example 13 (Reference)

In a reaction flask fitted with a stirrer, external cooling and a dosing device, a mixture of 93.6 g trimethyl-[2-(2-methylprop-2-enoyloxy)ethyl]ammonium chloride ("MADAME-Q") and 65 g water was introduced, and 2.34 g hydrogen peroxide (30%), 26 mg iron(II) sulfate and 1.26 g mercaptoethanol were added. The pH value was adjusted to 5.0 with sulfuric acid. The flask was cooled to 15° C. during the entire reaction. A solution of 1.5 g rongalite in 48.5 g water was added to the reaction mixture over 60 min (thereafter the polymerization was finished). The average molecular weight of the homopolymer (Mw) was 20.6 kDa, PDI=2.9.

Example 14 (Reference)

In a reaction flask fitted with a stirrer, external heating, reflux condenser and two dosing devices, 20 g water was introduced and degassed with nitrogen. 29.9 g Trimethyl-[2-(2-methylprop-2-enoyloxy)ethyl]ammonium chloride ("MADAME-Q") and 14.49 g 2-hydroxyethyl 2-methylprop-2-enoate (HEMA) were dissolved in 15 g water, acidified with sulfuric acid to pH 3, and subsequently the solution was degassed with nitrogen. The solution of monomers was introduced in the first dosing device, and the second dosing device was filled with a solution of 165 mg of the radical initiator WAKO VA-044 (2,2'-azobis[2-(2-imidazolin-2-yl)propane]dihydrochloride) in 15 g water. The flask was heated to 90° C. The contents of both dosing devices were added synchronously to the reaction flask during 3 hours. Subsequently the mixture was allowed to react for one additional hour at 90° C. The average molecular weight of the polymer (Mw) was 129 kDa PDI=1.8.

Example 15 (Reference)

In a reaction flask fitted with a stirrer, external heating, reflux condenser and two dosing devices, 20 g water was introduced and degassed with nitrogen. 29.9 g MADAME-Q and 14.49 g HEMA were dissolved in 15 g water and 1.5 g mercaptoethanol was added. The solution was acidified with sulfuric acid to pH 3 and subsequently degassed with nitrogen. The solution of monomers was introduced in the first dosing device, and the second dosing device was filled with a solution of 165 mg of the radical initiator WAKO VA-044 in 15 g water. The flask was heated to 90° C. The contents of both dosing devices were added synchronously to the reaction flask during 3 hours. Subsequently the mixture was allowed to react for one additional hour at 90° C. The average molecular weight of the polymer (Mw) was 12.6 kDa, PDI=3.5.

Example 16 (Reference)

In a reaction flask fitted with a stirrer, external heating, reflux condenser and two dosing devices, 20 g water was introduced and degassed with nitrogen. 29.9 g MADAME-Q and 14.49 g HEMA were dissolved in 15 g water and 1.0 g mercaptoethanol was added. The solution was acidified with sulfuric acid to pH 3 and subsequently degassed with nitrogen. The solution of monomers was introduced in the first dosing device, and the second dosing device was filled with a solution of 165 mg of the radical initiator WAKO VA-044 in 15 g water. The flask was heated to 90° C. The contents of both dosing devices were added synchronously to the reaction flask during 3 hours. Subsequently the mixture was allowed to react for one additional hour at 90° C. The average molecular weight of the polymer (Mw) was 15 kDa, PDI=3.2.

Example 17 (Reference)

In a reaction flask fitted with a stirrer, external cooling and two dosing devices, 98.7 g MADAME-Q and 50 g water were introduced, and 1.0 g hydrogen peroxide (30%) and 20 mg iron(II) sulfate were added. The pH value was adjusted to 5.0 with sulfuric acid. The dosing device 1 was filled with a solution of 16.2 g polyethylene glycol methyl ether methacrylate (average molecular weight 300 g/mol), 31 g water and 1.16 g 3-mercaptopropionic acid. The dosing device 2 was filled with a solution of 1.5 g rongalite in 48.5 g water. The flask was cooled to 15° C. during the entire reaction. The content of dosing device 1 was added to the reaction mixture, which was cooled to 15° C., during 30 min, and the content of dosing device 2 was subsequently added during 60 min. After the end of the addition of the rongalite solution the polymerization was finished. The average molecular weight of the polymer (Mw) was 31 kDa, PDI=1.8.

Example 18 (Reference)

In a reaction flask fitted with a stirrer, external heating, reflux condenser and two dosing devices, 30 g water was introduced and degassed with nitrogen. 77.9 g of a 75% aqueous solution of MADAME-Q plus 12.8 g of polyethylene glycol methyl ether methacrylate (average molecular weight 300 g/mol) were diluted with 63.3 g water plus 0.75 g mercaptoethanol. The solution was acidified with sulfuric acid to pH 3 and subsequently degassed with nitrogen. The solution of monomers was introduced in the first dosing device, and the second dosing device was filled with a solution of 250 mg of the radical initiator WAKO VA-044 in 22.5 g water. The flask was heated to 90° C. The contents of both dosing devices were added synchronously to the reaction flask during 3 hours. Subsequently the mixture was allowed to react for one additional hour at 90° C. The average molecular weight of the polymer (Mw) was 18 kDa, PDI=1.65.

Example 19 (Reference)

In a reaction flask fitted with a stirrer, external heating, reflux condenser and two dosing devices, 20 g water was introduced and degassed with nitrogen. 51.9 g of a 75% aqueous solution of MADAME-Q plus 13.5 g of polyethylene glycol methyl ether methacrylate (average molecular weight 475 g/mol) were diluted with 52 g water plus 0.5 g mercaptoethanol. The solution was acidified with sulfuric acid to pH 3 and subsequently degassed with nitrogen. The solution of monomers was introduced in the first dosing device, and the second dosing device was filled with a solution of 165 mg of the radical initiator WAKO VA-044 in 15 g water. The flask was heated to 90° C. The contents of both dosing devices were added synchronously to the reaction flask during 3 hours. Subsequently the mixture was allowed to react for one additional hour at 90° C. The average molecular weight of the polymer (Mw) was 20 kDa, PDI=1.65.

Example 20 (Reference)

In a reaction flask fitted with a stirrer, external heating, reflux condenser and two dosing devices, 20 g water was introduced and degassed with nitrogen. 45.9 g of a 75% aqueous solution of MADAME-Q plus 23.8 g of polyethylene glycol methyl ether methacrylate (average molecular weight 475 g/mol) were diluted with 68 g water plus 0.5 g mercaptoethanol. The solution was acidified with sulfuric acid to pH 3 and subsequently degassed with nitrogen. The solution of monomers was introduced in the first dosing device, and the second dosing device was filled with a solution of 165 mg of the radical initiator WAKO VA-044 in 15 g water. The flask was heated to 90° C. The contents of both dosing devices were added synchronously to the reaction flask during 3 hours. Subsequently the mixture was allowed to react for one additional hour at 90° C. The average molecular weight of the polymer (Mw) was 19.6 kDa, PDI=1.82.

Example 21 (Reference)

In a reaction flask fitted with a stirrer, external heating, reflux condenser and two dosing devices, 20 g water was introduced and degassed with nitrogen. 51.9 g of a 75% aqueous solution of MADAME-Q plus 31.2 g of polyethylene glycol methyl ether methacrylate (average molecular weight 1100 g/mol) were diluted with 85 g water plus 1.5 g mercaptoethanol. The solution was acidified with sulfuric acid to pH 3 and subsequently degassed with nitrogen. The solution of monomers was introduced in the first dosing device, and the second dosing device was filled with a solution of 165 mg of the radical initiator WAKO VA-044 in 15 g water. The flask was heated to 90° C. The contents of both dosing devices were added synchronously to the reaction flask during 3 hours. Subsequently the mixture was allowed to react for one additional hour at 90° C. The average molecular weight of the polymer (Mw) was 11 kDa, PDI=1.67.

Example 22 (Reference)

In a reaction flask fitted with a stirrer, external heating, reflux condenser and two dosing devices, 20 g water was introduced and degassed with nitrogen. 51.9 g of a 75% aqueous solution of MADAME-Q plus 31.2 g of polyethylene glycol methyl ether methacrylate (average molecular weight 1100 g/mol) were diluted with 85 g water plus 0.5 g mercaptoethanol. The solution was acidified with sulfuric acid to pH 3 and subsequently degassed with nitrogen. The solution of monomers was introduced in the first dosing device, and the second dosing device was filled with a solution of 165 mg of the radical initiator WAKO VA-044 in 15 g water. The flask was heated to 90° C. The contents of both dosing devices were added synchronously to the reaction flask during 3 hours. Subsequently the mixture was allowed to react for one additional hour at 90° C. The average molecular weight of the polymer (Mw) was 24 kDa, PDI=1.79.

Example 23 (Reference)

In a reaction flask fitted with a stirrer, external heating, reflux condenser and two dosing devices, 32 g water was introduced and degassed with nitrogen. 60.3 g of a 75% aqueous solution of MADAME-Q plus 125.4 g of polyethylene glycol methyl ether methacrylate (average molecular weight 950 g/mol) were diluted with 269 g water plus 0.81 g mercaptoethanol. The solution was acidified with sulfuric acid to pH 3 and subsequently degassed with nitrogen. The solution of monomers was introduced in the first dosing device, and the second dosing device was filled with a solution of 267 mg of the radical initiator WAKO VA-044 in 24 g water. The flask was heated to 90° C. The contents of both dosing devices were added synchronously to the reaction flask during 3 hours. Subsequently the mixture was allowed to react for one additional hour at 90° C. The average molecular weight of the polymer (Mw) was 25.9 kDa, PDI=1.9.

Example 24

In a reaction flask fitted with a stirrer, external heating, reflux condenser and three dosing devices, 10 g water was introduced and degassed with nitrogen. 19 g polyethylene glycol methyl ether methacrylate (average molecular weight 950 g/mol) and 0.41 g mercaptoethanol were dissolved in 19 g water. The solution was acidified with sulfuric acid to pH 3 and subsequently degassed with nitrogen. The solution of monomers was introduced in the first dosing device. 22.4 g of N-vinylimidazole which was quaternized with methyl tosylate ("VI-Q") was dissolved in 22.4 g water. The solution was acidified with sulfuric acid to pH 3, subsequently degassed with nitrogen and filled in the second dosing device. The third dosing device was filled with a solution of 670 mg of the radical initiator WAKO VA-044 in 11.2 g water. The reaction flask was heated to 90° C., and the contents of the three dosing devices was added during 3 hours. Subsequently the mixture was allowed to react for one additional hour at 90° C. The average molecular weight of the polymer (Mw) was 5.5 kDa, PDI=1.77.

Example 25

In a reaction flask fitted with a stirrer, external heating, reflux condenser and two dosing devices, 14 g VI-Q was introduced dissolved in 14 g of water. The solution was acidified with sulfuric acid to pH 3 and subsequently degassed with nitrogen. The first dosing device was filled with 47.5 g polyethylene glycol methyl ether methacrylate (average molecular weight 950 g/mol) and 0.31 g mercaptoethanol, dissolved in 47.5 g water. The second dosing device was filled with a solution of 615 mg of the radical initiator WAKO VA-044 in 11.2 g water. The reaction flask was heated to 90° C., and the contents of the two dosing devices was added during 3 hours. Subsequently the mixture was allowed to react for one additional hour at 90° C. The average molecular weight of the polymer (Mw) was 11 kDa, PDI=2.61.

Example 26

In a reaction flask fitted with a stirrer, external heating, reflux condenser and two dosing devices, 36 g VI-Q was introduced dissolved in 36 g of water. The solution was acidified with sulfuric acid to pH 3 and subsequently degassed with nitrogen. The first dosing device was filled with 20.3 g polyethylene glycol methyl ether methacrylate (average molecular weight 950 g/mol) and 0.28 g mercaptoethanol, dissolved in 20.3 g water. The second dosing device was filled with a solution of 560 mg of the radical initiator WAKO VA-044 in 11.2 g water. The reaction flask was heated to 90° C., and the contents of the two dosing devices was added during 3 hours. Subsequently the mixture was allowed to react for one additional hour at 90° C. The average molecular weight of the polymer (Mw) was 8.6 kDa, PDI=2.3.

Example 27

In a reaction flask fitted with a stirrer, external heating, reflux condenser and one dosing device, 28 g VI-Q and 95 g polyethylene glycol methyl ether methacrylate (average molecular weight 950 g/mol) were introduced dissolved in 125 g water. The solution was charged with 0.61 g mercaptoethanol, acidified with sulfuric acid to pH 3 and subsequently degassed with nitrogen. The dosing device was filled with a solution of 1.2 g of the radical initiator WAKO VA-044 in 22.5 g water. The reaction flask was heated to 90° C., and the contents of the dosing device was added during 3 hours. Subsequently the mixture was allowed to react for one additional hour at 90° C. The average molecular weight of the polymer (Mw) was 18 kDa, PDI=3.81.

Example 28

In a reaction flask fitted with a stirrer, external heating, reflux condenser and two dosing devices, 28.5 g water and 28.5 g polyethylene glycol methyl ether methacrylate (average molecular weight 950 g/mol) were introduced and degassed with nitrogen. Mercaptoethanol (0.3 g) was added, and the reaction mixture was adjusted to pH 3 with sulfuric acid. 33.6 g VI-Q was dissolved in 33.6 g water, degassed with nitrogen and introduced in the first dosing device. The second dosing device was filled with a solution of 460 mg of the radical initiator WAKO VA-044 in 11.2 g water. The flask was heated to 90° C. The contents of both dosing devices were added synchronously to the reaction flask during 3 hours. Subsequently the mixture was allowed to react for one additional hour at 90° C. The average molecular weight of the polymer (Mw) was 9 kDa, PDI=2.4.

Example 29

In a reaction flask fitted with a stirrer, external heating, reflux condenser and two dosing devices, 22.4 g water and 22.4 g VI-Q were introduced and degassed with nitrogen. The pH value was subsequently adjusted to 3 with sulfuric acid. 19 g polyethylene glycol methyl ether methacrylate (average molecular weight 950 g/mol) and 0.41 g mercaptoethanol were dissolved in 19 g water, adjusted to pH 3 with sulfuric acid, degassed with nitrogen and filled in the first dosing device. The second dosing device was filled with a solution of 693 mg of the radical initiator WAKO VA-044 in 11.2 g water. The flask was heated to 90° C. The contents of both dosing devices were added synchronously to the reaction flask during 3 hours. Subsequently the mixture was allowed to react for one additional hour at 90° C. The average molecular weight of the polymer (Mw) was 5.6 kDa, PDI=2.2.

Example 30

In a reaction flask fitted with a stirrer, external heating, reflux condenser and two dosing devices, 38 g polyethylene glycol methyl ether methacrylate (average molecular weight 950 g/mol) was introduced, dissolved in 38 g water and degassed with nitrogen. Mercaptoethanol (0.37 g) was added, and the reaction mixture was adjusted to pH 3 with sulfuric acid. 33.2 g of a 75% aqueous solution of MADAME-Q plus 3.76 g VI-Q were dissolved in 54 g water, adjusted to pH 3 with sulfuric acid and degassed with nitrogen. The solution of monomers was introduced in the first dosing device, and the second dosing device was filled with a solution of 750 mg of the radical initiator WAKO VA-044 in 15 g water. The flask was heated to 90° C. The contents of both dosing devices were added synchronously to the reaction flask during 3 hours. Subsequently the mixture was allowed to react for one additional hour at 90° C. The average molecular weight of the polymer (Mw) was 14.7 kDa, PDI=1.9.

Example 31

In a reaction flask fitted with a stirrer, external heating, reflux condenser and two dosing devices, 28 g VI-Q was introduced dissolved in 28 g water. The pH value was adjusted to 3 with sulfuric acid, and subsequently the solution was degassed with nitrogen. 95 g polyethylene glycol methyl ether methacrylate (average molecular weight 950 g/mol) and 0.62 g mercaptoethanol were dissolved in 95 g water, adjusted with sulfuric acid to pH 3, degassed with nitrogen and filled in the first dosing device. The second dosing device was filled with a solution of 1.23 g of the radical initiator WAKO VA-044 in 22.5 g water. The flask was heated to 90° C. The contents of both dosing devices were added synchronously to the reaction flask during 5 hours. Subsequently the mixture was allowed to react for one additional hour at 90° C. The average molecular weight of the polymer (Mw) was 9.5 kDa, PDI=2.3.

Example 32 (Reference)

In a reaction flask fitted with a stirrer, external heating, reflux condenser and one dosing device, 84.1 g VI-Q was introduced dissolved in 84.1 g of water. The pH value was adjusted to 3 with sulfuric acid, and subsequently the solution was degassed with nitrogen. The dosing device was filled with a solution of 420 mg of the radical initiator WAKO VA-044 in 34 g water. The flask was heated to 90° C. The contents of the dosing device was added to the reaction flask during 3 hours. Subsequently the mixture was allowed to react for one additional hour at 90° C. The average molecular weight of the homopolymer (Mw) 4.6 kDa, PDI=1.75.

Application Tests:

In the following tests the mortar liquefaction (spread) of geopolymer binder systems with the cationic copolymers of the invention was tested. Aluminosilicate mortars were produced using a mortar mixer according to DIN EN 196-1. All ingredients were mixed according DIN EN 196-1, expect that the quartz sand was added upfront to the mixer instead off adding it at the end of the mixing process. The mortar spread was measured by means of a Haegermann cone after 15 times knocking on a spread table (DIN EN 1015-3). The binder system contained of the ingredients blast furnace slag, fly ash type F and silica fume (amounts given in weight %).

|  | CaO | $SiO_2$ | $Al_2O_3$ | MgO | $Fe_2O_3$ | $TiO_2$ | $K_2O$ | Rest |
|---|---|---|---|---|---|---|---|---|
| Slag | 42.8 | 34.7 | 11.4 | 5.3 | 0.7 | 1.2 | 0.6 | 3.3 |
| Fly ash | 3.1 | 53.4 | 26.8 | 2.0 | 5.7 | 1.1 | 4.5 | 3.4 |
| Silica fume | 0.2 | 98.1 | 0.0 | 0.2 | 0.0 | 0.0 | 0.8 | 0.7 |

All tested cationic copolymers were formulated with 4 weight % Defoamer DF93, relative to the polymer. The polymer dosage was 1 weight %, relative to the geopolymer binder.

Example 33

The following geopolymer binder system was prepared:

| Silica fume | 150 g |
| Fly ash Type F | 150 g |
| Quartz sand | 700 g |
| KOH | 13 g |
| Cationic copolymer | 3 g |

The water/(silica fume+fly ash) ratio was 0.83. The spread values are given in Table 2. Spreads after 6 min and 30 min are given in cm. The sample numbers refer to the corresponding Experiments hereinabove.

TABLE 2

| Sample | w/o | E23* | E2 |
|---|---|---|---|
| Spread 6 min | 15.8 | 16.8 | 21.5 |
| Spread 30 min | 16 | 17.5 | 23.3 |

*comparative

Example 34

The following geopolymer binder system was prepared:
Slag 300 g
Quartz sand 700 g
KOH 32 g
Cationic copolymer 3 g The water/slag ratio was 0.60. The spread values are given in Table 3. Spreads after 6 min and 30 min are given in cm. The sample numbers refer to the corresponding Experiments hereinabove.

TABLE 3

| Sample | w/o | E23* | E25 | E29 | E31 |
|---|---|---|---|---|---|
| Spread 6 min | 19.6 | 19 | 21.9 | 21.1 | 20.6 |
| Spread 30 min | 17.6 | 18.9 | 19.4 | 20.5 | 19.7 |

*comparative

Example 35

The following geopolymer binder system was prepared:

| | |
|---|---|
| Slag | 300 g |
| Quartz sand | 700 g |
| $Na_2CO_3$ | 6 g |
| Cationic copolymer | 3 g |

The water/slag ratio was 0.583. The spread values are given in Table 4 hereinbelow (two parts). Spreads after 6 min and 30 min are given in cm. The sample numbers refer to the corresponding Experiments hereinabove.

TABLE 4

(Part I)

| Sample | w/o | E21* | E22* | E23* | E25 | E26 | E28 | E29 | E31 |
|---|---|---|---|---|---|---|---|---|---|
| Spread 6 min | 16.6 | 19.8 | 19.5 | 17.2 | 22.8 | 20.7 | 20.4 | 21.4 | 21.9 |
| Spread 30 min | 16.3 | 19.3 | 19 | 17.1 | 22.3 | 20.6 | 19.9 | 21 | 20.7 |

*comparative

TABLE 4

(Part II)

| Sample | E2 | E3 | E4 | E9 | E10 | E11 | E12 |
|---|---|---|---|---|---|---|---|
| Spread 6 min | 24.2 | 21.6 | 22.2 | 25.4 | 24.5 | 23.4 | 21.7 |
| Spread 30 min | 22.8 | 21 | 22.1 | 23.5 | 23.9 | 22.1 | 19.9 |

Example 36

The following geopolymer binder system was prepared:

| | |
|---|---|
| Slag | 300 g |
| Quartz sand | 700 g |
| $Na_2SiO_3$ | 6 g |
| Cationic copolymer | 3 g |

The water/slag ratio was 0.583. The spread values are given in Table 5 hereinbelow (two parts). Spreads after 6 min and 30 min are given in cm. The sample numbers refer to the corresponding Experiments hereinabove.

TABLE 5

(Part I)

| Sample | w/o | E21* | E22* | E23* | E25 | E26 | E28 | E29 | E30 | E31 |
|---|---|---|---|---|---|---|---|---|---|---|
| Spread 6 min | 17 | 18.1 | 18.4 | 17.9 | 18.8 | 21.2 | 18.9 | 19.3 | 18.8 | 18.9 |
| Spread 30 min | 16 | 16.9 | 16.7 | 16.5 | 17.5 | 18.4 | 17.8 | 18 | 17.4 | 17.6 |

*comparative

TABLE 5

(Part II)

| Sample | E1 | E2 | E3 | E4 | E7 | E9 | E10 | E11 | E12 |
|---|---|---|---|---|---|---|---|---|---|
| Spread 6 min | 19 | 25.5 | 23.9 | 21.1 | 19.8 | 25.7 | 26.8 | 22.5 | 24.7 |
| Spread 30 min | 17.2 | 23.2 | 22.2 | 19.1 | 18.6 | 22.6 | 23 | 19.9 | 21.2 |

These application tests clearly show the superiority of the cationic copolymers of the invention.

Example 37

The following geopolymer binder system was prepared:

| | |
|---|---|
| Silica fume | 150 g |
| Fly ash Type F | 150 g |
| Quartz sand | 700 g |
| $Na_2SiO_3$ | 24 g |
| Cationic polymer | 3 g |

The water/(silica fume+fly ash) ratio was 0.83. The spread values are given in Table 2. Spreads after 6 min and 30 min are given in cm. The sample numbers refer to the corresponding Experiments hereinabove.

Different amounts of polyvalent anions as acids or salts were added to improve the effect of the cationic polymer. Table 6 presents the effect of dibasic sodium phosphate as added phosphate salt. Table 7 presents the effect of diethylenetriamine-penta (methylenephosphonate) (DTPMP) added as acid. Finally, Table 8 presents the effect of Aminotris(methylenephosphonate) (ATMP) added as acid.

TABLE 6

| Sample | w/o | E32 | w/o | E32 | w/o | E32 |
|---|---|---|---|---|---|---|
| Added salt [g] | 0 | 0 | 3.5 | 3.5 | 7.0 | 7.0 |
| Spread 6 min | 17.8 | 21.5 | 18 | 23.5 | 18.2 | 25.3 |
| Spread 30 min | 17.9 | 23.3 | 17.6 | 26.3 | 18.0 | 28.9 |

TABLE 7

| Sample | w/o | E32 | w/o | E32 | w/o | E32 |
|---|---|---|---|---|---|---|
| Added acid [g] | 0 | 0 | 2.8 | 2.8 | 5.6 | 5.6 |
| Spread 6 min | 17.8 | 21.5 | 18.7 | 20.9 | 19.0 | 22.8 |
| Spread 30 min | 17.9 | 23.3 | 17.8 | 27.4 | 17.2 | >30 |

TABLE 8

| Sample | w/o | E32 | w/o | E32 | w/o | E32 |
|---|---|---|---|---|---|---|
| Added acid [g] | 0 | 0 | 1.2 | 1.2 | 2.5 | 2.5 |
| Spread 6 min | 17.8 | 21.5 | 19.3 | 22.1 | 19.2 | 25.3 |
| Spread 30 min | 17.9 | 23.3 | 18.3 | 27.0 | 18.1 | >30 |

These application tests clearly show that polyvalent anions enhance the dispersing effect of cationic polymers, while having only a small effect where no cationic polymer is present. This proves a synergetic effect of polyvalent anions together with cationic polymers. Moreover, the dispersing effect of some combinations even increases over time.

The invention claimed is:

1. A cationic copolymer, comprising
   a) 3 to 97 mol-% of a cationic structural unit of formula (III)

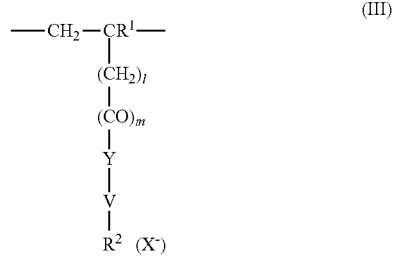

wherein
$R^1$ in each occurrence is the same or different and represents hydrogen and/or methyl,
$R^2$ in each occurrence is the same or different and is selected from the group consisting of:

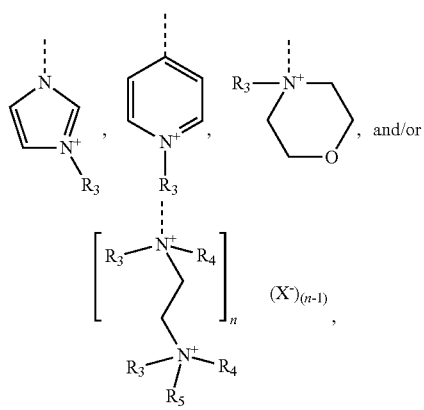

wherein
$R^3$, $R^4$ and $R^5$ in each occurrence are the same or different and each independently represent hydrogen, an aliphatic hydrocarbon moiety having 1 to 20 carbon atoms, a cycloaliphatic hydrocarbon moiety having 5 to 8 carbon atoms, aryl having 6 to 14 carbon atoms and/or a polyethylene glycol (PEG) moiety,
$l$ in each occurrence is the same or different and represents an integer from 0 to 2,
m in each occurrence is the same or different and represents 0 or 1,
n in each occurrence is the same or different and represents an integer from 1 to 10,
Y in each occurrence is the same or different and represents an absent group, oxygen, NH and/or $NR^3$,
V in each occurrence is the same or different and represents

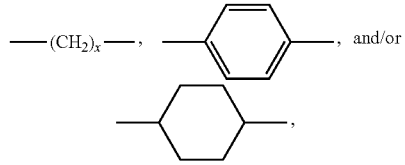

wherein
x in each occurrence is the same or different and represents an integer from 1 to 6, and
X in each occurrence is the same or different and represents a halogen atom, a $C_{1-4}$-alkyl sulfate, a $C_{1-4}$-alkyl sulfonate, a $C_{6-14}$-(alk)aryl sulfonate and/or a monovalent equivalent of a polyvalent anion, which is selected from a sulfate, a disulfate, a phosphate, a diphosphate, a triphosphate and/or a polyphosphate; and
   b) 97 to 3 mol-% of a macromonomeric structural unit of formula (IV)

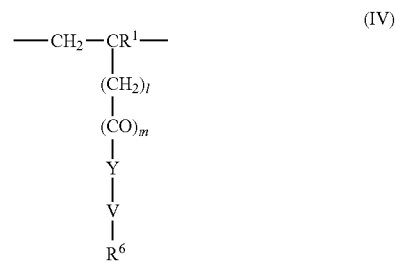

wherein
$R^6$ in each occurrence is the same or different and represents a polyoxyalkylene group of the following formula (V)

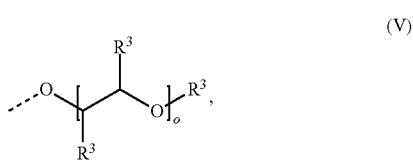

wherein
o in each occurrence is the same or different and represents an integer from 1 to 300, and $R^1$, $R^3$, l, m, Y, V, and x have the meanings given above,
wherein the cationic copolymer has molecular weight in the range of from 1000 to 500000.

2. The cationic copolymer of claim 1, wherein the monomer components corresponding to the structural units (III) and (IV) are selected from vinyl ethers, vinyloxy $C_{1-6}$-alkyl ethers, vinyloxy butyl ethers, allyl ethers, methallyl ethers, 3-butenyl ethers, isoprenyl ethers, acrylic esters, methacrylic esters, acrylamides, methacrylamides, and mixtures thereof.

3. The cationic copolymer of claim 1, wherein o is from 5 to 300.

4. The cationic copolymer of claim 1, wherein the oxyalkylene units of the polyoxyalkylene group of formula (V) are selected from ethylene oxide groups and propylene oxide groups, which are arranged randomly, alternatingly, graduatedly and/or blockwise within the polyoxyalkylene group.

5. The cationic copolymer of claim 4, characterized in that the polyoxyalkylene group of formula (V) is a mixture with different values for o within the specified definition.

6. The cationic copolymer of claim 1, comprising 10 to 90 mol-% of the cationic structural unit and 90 to 10 mol-% of the macromonomeric structural unit.

7. The cationic copolymer of claim 1, wherein o is from 10 to 200.

8. The cationic copolymer of claim 1, comprising 25 to 75 mol-% of the cationic structural unit and 75 to 25 mol-% of the macromonomeric structural unit.

9. The cationic copolymer of claim 1, having a molecular weight in the range of from 2000 to 150000 g/mol.

* * * * *